United States Patent [19]

Huffaker

[11] Patent Number: 4,558,751
[45] Date of Patent: Dec. 17, 1985

[54] APPARATUS FOR TRANSPORTING EQUIPMENT THROUGH A CONDUIT

[75] Inventor: Roger W. Huffaker, Houston, Tex.

[73] Assignee: Exxon Production Research Co., Houston, Tex.

[21] Appl. No.: 637,177

[22] Filed: Aug. 2, 1984

[51] Int. Cl.⁴ .................... B65H 59/00; E21B 43/00; E21C 29/16; H02G 1/08
[52] U.S. Cl. .................... 175/99; 15/104.05; 175/103; 254/134.4
[58] Field of Search .................... 175/97, 99, 103, 104, 175/325; 166/55.7; 15/104.06 R, 104.05, 104.16; 254/134.5, 134.4, 134.6; 104/155-159; 105/63

[56] References Cited

U.S. PATENT DOCUMENTS

| | | | |
|---|---|---|---|
| 2,518,330 | 8/1950 | Jasper et al. | 254/134.5 |
| 2,974,932 | 3/1961 | Xenis | 15/104.05 X |
| 3,495,546 | 2/1970 | Brown et al. | 15/104.06 |
| 4,113,236 | 9/1978 | Neinast | 254/134.5 |
| 4,378,051 | 3/1984 | Cholet et al. | 166/383 |

Primary Examiner—Donald Watkins
Assistant Examiner—Thomas R. Hannon
Attorney, Agent, or Firm—Richard F. Phillips

[57] ABSTRACT

Apparatus 10 for propelling equipment through a fluid-filled conduit 12, such as a pipeline or oil well tubular. The propulsion apparatus incorporates first and second elements 14,16 adapted to be moved in a first axial direction through the conduit 12 and to resist being moved in the opposite axial direction. The first and second elements 14,16 are connected by a biasing element 18 which is adapted to move the first and second elements 14,16 toward one another in response to increasing the pressure within the conduit 12 and to move the first and second elements 14,16 away from one another in response to decreasing the pressure. By cycling the pressure of the fluid within the conduit 12, the propulsion apparatus 10 propels itself through the conduit 12. In one embodiment, the first and second elements 14,16 are adapted to reverse, on operator command, the direction of permitted travel of the propulsion apparatus 10.

18 Claims, 10 Drawing Figures

APPARATUS FOR TRANSPORTING EQUIPMENT THROUGH A CONDUIT

FIELD OF THE INVENTION

The present invention relates generally to apparatus for transporting equipment through a conduit. More particularly, the present invention relates to a device adapted to transport equipment through a fluid-filled conduit in response to cycling the pressure of the conduit fluid between two pressure levels.

BACKGROUND OF THE INVENTION

The use of lengthy conduits for the purpose of transporting a fluid is common to many technical fields. Familiar examples include hydrocarbon production and transportation, water distribution, municiple sewerage, coal slurry pipelining, steam distribution, and pneumatic transfer systems. It is often necessary to pass tools through such conduits to perform maintenance, monitoring and other tasks. This is an especially common practice in hydrocarbon production and transportation, where it is often necessary to transport conduit cleaning elements, well logging equipment, various types of valves, impression block tools and other equipment through a pipeline, wellbore casing, service line or borehole.

One class of through-conduit tool used for this purpose is adapted to be pumped through the conduit to the desired location. The use of such tools requires that a fluid circulation path be present through the conduit. In another class of through-conduit tool, adapted for use in downwardly inclined conduits, positioning by gravity and retrieval by cable are utilized. However, if a fluid circulation path does not exist, or is blocked, and if gravity positioning is not possible, operations requiring the use of through-conduit tools pose substantial difficulties.

For use in situations where positioning by fluid circulation or gravity is not possible, several types of through-conduit propulsion devices have been developed. One such propulsion device is disclosed in U.S. Pat. No. 2,518,330, issued Aug. 8, 1950. This device includes two conduit gripping elements which may be extended and retracted relative to one another by a pneumatic element. The pneumatic element is powered by an external pneumatic pressure source connected by flexible hose to the propulsion device. One of the gripping elements anchors itself to the conduit upon extension of the gripping element and the other anchors itself upon retraction of the gripping element. In this manner, the pneumatic element moves in inch-worm fashion through the conduit. This device is disadvantageous in that no mechanism is provided for allowing reversal of the direction of travel. Further, the use of a pneumatic umbilical, owing to its relatively great diameter and significant weight per unit length, imposes a high drag on the propulsion device. Such an apparatus would be of little or no utility in conduits where there are many bends or where the distance to be travelled is great.

Another class of such propulsion devices receives fluid at one end and forceably ejects it from the other, in this manner propelling itself through the conduit. Examples of such devices are set forth in U.S. Pat. No. 4,378,051, issued Mar. 29, 1983 and U.S. Pat. No. 4,113,236, issued Sept. 12, 1978. Such devices are disadvantageous in that they must be connected by flexible cable to a remote power supply for powering the propulsion pump. The use of a flexible cable has many of the disadvantages of the hydraulic umbilical discussed above.

It would be advantageous to have a propulsion device for transporting equipment through a conduit wherein the propulsion device does not require the supply of electrical or fluid power transmitted through a cable or flowline extending through the conduit from an external power supply.

SUMMARY OF THE INVENTION

Apparatus is set forth which is useful in propelling equipment through a fluid-filled conduit. The propulsion apparatus includes two unidirectional movement elements adapted to accept movement through the conduit in a first axial direction, and to resist being moved in the opposite axial direction. Preferably, these two elements are wedge and slip assemblies. Positioned intermediate the two unidirectional movement elements is an extensible-retractable element for biasing the unidirectional movement elements toward one another in response to setting the fluid pressure within the conduit to a first pressure level and away from one another in response to setting the fluid pressure to a second pressure level. Preferably, the extensible-retractable element is a sealed piston-cylinder assembly with the first unidirectional movement element attached to the piston and the second unidirectional movement element attached to the cylinder. In response to cycling the pressure of the conduit between two appropriate pressure levels, the extensible-retractable element repeatedly forces the unidirectional movement elements together and apart, causing the propulsion apparatus to travel through the conduit in the first axial direction.

The propulsion apparatus is especially useful in situations where fluid flow through a conduit is blocked. For example, in through-flowline oil and gas well operations fluid flow through the flowline is occasionally prevented due to a stuck valve, debris accumulation or other reason. The propulsion apparatus can be used to transport equipment to remedy the situation. In one embodiment of the propulsion apparatus, a mechanism for selectively reversing the permitted direction of travel is provided. This permits the propulsion apparatus to be cycled back to its starting point upon completion of its task without the need for any special retrieval apparatus.

BRIEF DESCRIPTION OF THE DRAWINGS

For a better understanding of the present invention, reference may be had to the accompanying drawings, in which.

These drawings are not intended as a definition of the invention, but are provided solely for the purpose of illustrating certain preferred embodiments of the invention as described below.

DESCRIPTION OF THE PREFERRED EMBODIMENTS

Figure 1:
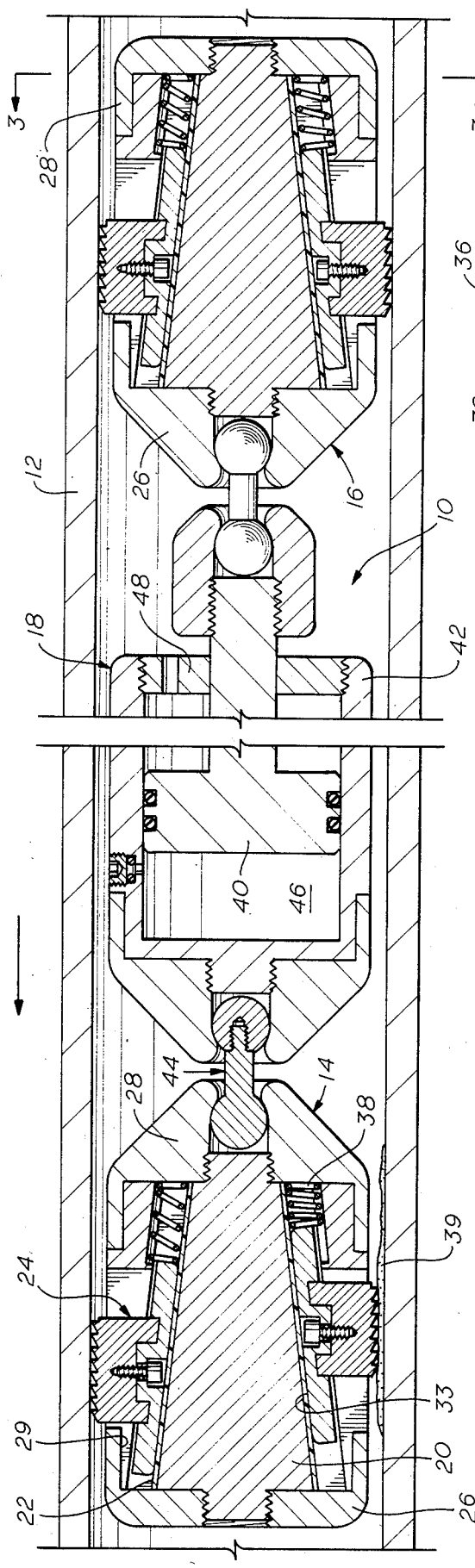
FIG. 1 is a cross-sectional view of a preferred embodiment of the propulsion apparatus, this view being taken along a plane passing through the longitudinal axis of the propulsion apparatus and conduit.

Illustrated in FIG. 1 is a preferred embodiment of apparatus 10 for propelling equipment through a conduit 12. As described below and as shown in the FIGURES, the propulsion apparatus 10 is adapted for use in propelling service equipment through liquid-filled conduits in oil and gas wells. However, those skilled in the art will recognize in view of the following discussion that the propulsion apparatus 10 has a broad range of applications in the field of transporting articles through conduits and is not limited to use solely in oil and gas producing operations. To the extent that the following discussion is specific to moving equipment through oil and well tubing, this is by way of illustration rather than limitation.

In the preferred embodiment, the propulsion apparatus 10 includes three basic components: a first element 14 (first unidirectional gripping element) adapted to permit itself to be moved in a first axial direction through the conduit 12 and to resist being moved in the opposite axial direction through the conduit 12; a second element 16 (second unidirectional gripping element) substantially similar to the first element 14 and having the same direction of permitted travel; and, means 18 for biasing the first and second gripping elements 14,16 toward one another in response to the pressure of the fluid within the conduit 12 being brought to a first pressure level and away from one another in response to the pressure being brought to a second pressure level.

As illustrated in FIG. 1, the gripping elements 14, 16 are preferably wedge and slip assemblies. A main body portion 20 of each gripping element 14,16 defines four inclined bearing surfaces 22 symetrically arranged about the longitudinal axis of the main body portion 20. These bearing surfaces 22 serve as wedges for four corresponding slip assemblies 24. Each slip assembly 24 is adapted to move fore and aft along its corresponding bearing surface 22. As the slip assembly 24 moves upslope along the bearing surface 22 (leftward in FIG. 1), it is displaced a radially outward distance from the longitudinal axis of the gripping element 14. Similarly, as the slip assembly 24 moves downslope along the bearing surface 22 (rightward in FIG. 1), it is displaced to a position radially nearer the longitudinal axis of the gripping element 14.

Each gripping element 14,16 is provided with first and second end portions 26,28 attached by threaded connection to the fore and aft ends, respectively, of the main body portion 20. As best shown FIG. 2, the main body portion 20 and the first end portion 26 define four enclosed slip containment areas 29, each accommodating a corresponding slip assembly 24. The slip containment areas 29 allow a preselected degree of fore and aft movement of the slip assembly 24 while maintaining the bearing surface 33 of each slip assembly 24 in full surface contact with the corresponding bearing surface 22 of the main body portion 20 through the full range of fore and aft movement.

Figure 2:
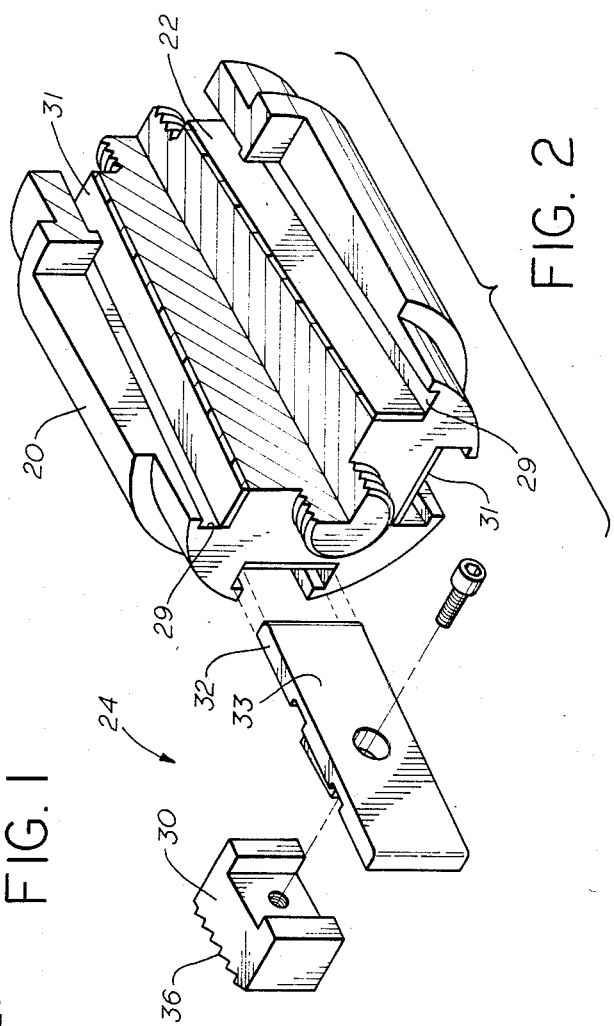
FIG. 2 is an isometric, partially exploded view of one of the unidirectional gripping elements of the propulsion apparatus shown in FIG. 1.

As best shown in FIG. 2, the slip assemblies 24 are each composed of a slip element 30 and a support element 32. The support element 32 extends fore and aft beyond the slip element 30 and cooperates with the main body portion 20 to retain the slip assemblies 24 within the slip containment areas 29. The slip elements 30 are provided with case hardened teeth 36 for gripping the inner surface of the conduit 12. The teeth 36 have a curved lateral profile corresponding to the conduit inside diameter. The slip assemblies 24 are configured such that the bearing surface 33 of each is tapered, relative to the gripping teeth 36, at the same angle as the inclined main body portion bearing surfaces 22. Accordingly, through the full range of movement of the slip assembly 24, the surface defined by the slip assembly teeth 36 remains substantially parallel to the longitudinal axis of the propulsion apparatus 10. This promotes proper full surface engagement of the teeth 36 with the conduit 12. In the preferred embodiment each inclined bearing surface 22 is faced with a bearing material 31, such as a thin teflon sheet, to facilitate fore and aft movement of the slip assembly 24.

Figure 3:
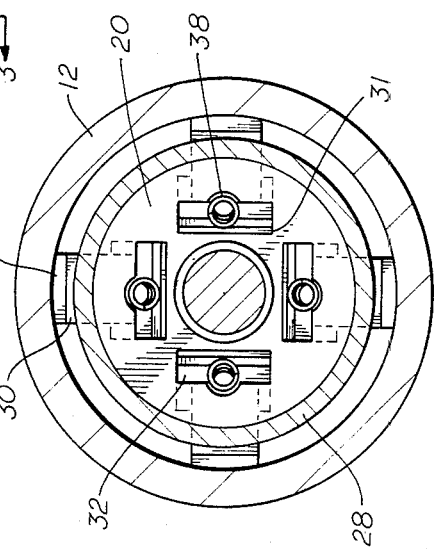
FIG. 3 is a cross-sectional view being taken along section line 3—3 of FIG. 1.

The slip assemblies 24 and main body portion 20 are configured such that when each slip assembly 24 is positioned at a selected point intermediate the limits of its fore and aft movement within the slip containment area 29, the gripping teeth 36 of each slip assembly 24 just touch the inner surface of the conduit 12. By forcing the slip assemblies 24 upslope along the bearing surface 22, the gripping teeth 36 move radially outward, biting into the conduit 12. Moving the slip assemblies 24 in the opposite direction removes the wedging load forcing the gripping elements 14 into contact with the conduit 12. The propulsion apparatus 10 of FIGS. 1-3 is adapted for use in conduits having a limited range of inner diameters. To accommodate conduits of other inner diameters, slip elements 30 of greater or lesser height than those shown in FIGS. 1-3 could be substituted.

Means 38 are provided for biasing each slip assembly 24 in an upslope direction along its corresponding bearing surface 22. Under the action of biasing means 38, the gripping teeth 36 of each slip assembly 24 are displaced radially outward as the slip assembly 24 moves upslope, thus maintaining the slip assembly 24 in constant contact with the inner surface of the conduit 12. As shown in FIG. 1, the slip assembly biasing means 38 is preferably a compressed coil spring interposed between the slip assembly 24 and second end portion 28. Irregularities 39 in the inner diameter of the conduit 12, such as excess weld, corrosion, and the like, are accommodated by the ability of the slip assembly 24 to move downslope on the bearing surface 22 in response to encountering a restriction.

The biasing of the slip assemblies 24 to a radially outward position results in efficient operation of the gripping element 14. In response to urging the gripping element 14 in the bearing surface downslope direction the slip assemblies 24 are forced upslope along the bearing surfaces 22. This forces the slip assembly teeth 36 radially outward, causing the slip assemblies 24 to bite into the conduit inner surface. Further biasing of the gripping element 14 in the bearing surface downslope direction results in increased wedging of the slip assemblies 24 between the bearing surfaces 22 and the conduit inner surface. This locks the gripping element 14 against movement. In response to urging the gripping element 14 in the opposite (upslope) direction, the wedging force on the slip assemblies 24 is relieved, eliminating the radial outward loading on the slip assemblies 24. This prevents the slip assemblies 24 from biting into the conduit 12, thereby permitting unrestrained motion of the gripping elements 14 in the upslope direction of the inclined bearing surface 22.

The two gripping elements 14,16 have a common orientation within the conduit 12, so that both move freely in one direction and resist movement in the other direction. As shown in FIG. 1, the gripping elements 14,16 are preferably substantially identical in construction, differing only in reversal of the end portions 26,28.

The gripping element biasing means 18 is positioned intermediate the two gripping elements 14,16. Broadly, the biasing means 18 is a device having first and second opposed ends moveable relative to one another between an extended condition and a retracted condition in response to changing the pressure of the fluid within the conduit 12. More specifically, as shown in FIG. 1, the biasing means 18 is a piston-cylinder assembly with the piston 40 connected to one of the gripping elements 16 and the cylinder 42 connected to the other gripping element 14. As the piston 40 moves into the cylinder 42, the gripping elements 14,16 are displaced toward one another, and as the piston 40 moves out of the cylinder 42, the gripping elements are moved apart. The total displacement of the gripping elements 14,16 relative to one another is equal to the stroke of the piston 40. In an alternate embodiment, the biasing means 18 includes a plurality of piston-cylinder assemblies attached end to end intermediate the gripping elements 14,16. This arrangement yields a long effective stroke while avoiding the use of a single long rigid piston-cylinder assembly.

In the preferred embodiment the gripping elements 14,16 are connected to the biasing means 18 by ball and socket couplings 44 or other pivotable connectors. This facilitates use of the propulsion apparatus 10 in curved conduits. For similar reason, where a plurality of series connected piston cylinder assemblies are used, they should be joined by pivotable connectors.

Figure 4:
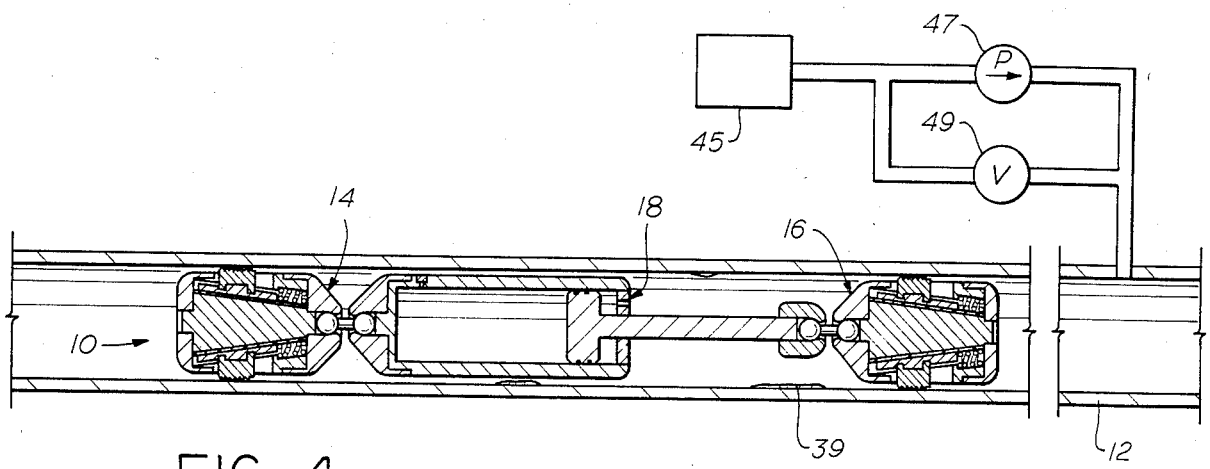
FIGS. 4–7 are a sequence of simplified, partial cross-sectional views taken along the longitudinal axis of the propulsion apparatus illustrating the movement of the propulsion apparatus through a conduit.
Figure 5:
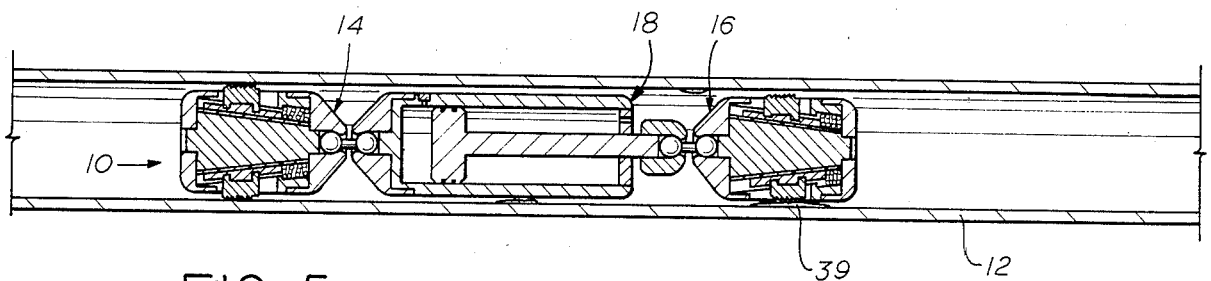
Figure 6:
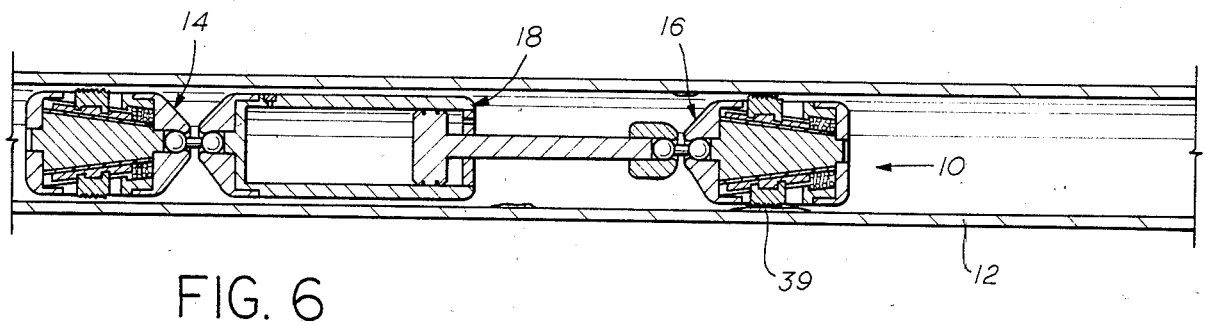
Figure 7:
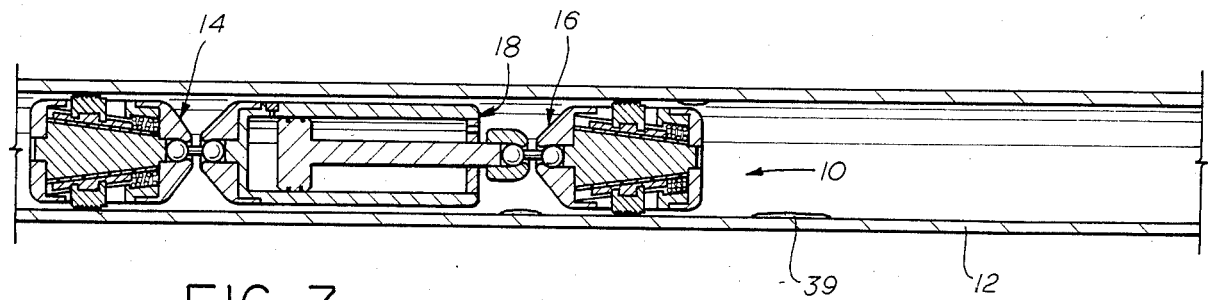

The cylinder 42 and piston 40 define a sealed region 46 charged with a gas or other compressible fluid. Maintenance of the integrity of this sealed region is important because, as will be seen below, the biasing means 18 is powered by a pressure imbalance acting on the piston 40. This pressure imbalance is equal to the difference between the pressure applied to the piston 40 by the fluid within the sealed region 46 and the pressure of the fluid within the conduit 12. A stop 48 is provided to limit movement of the piston 40 out of the cylinder 42. Operation of the biasing means 18 is brought about by cycling the pressure of the fluid within the conduit 12 between a relatively high pressure $P_1$ and a relatively low pressure $P_2$. Preferably, this pressure cycling is brought about through use of a pump 47 and pressure relief valve assembly 49, as illustrated in FIG. 4. A fluid reservoir 45 serves to supply the pump 47 with a fluid compatible with the fluid in the conduit 12.

Figure 8:
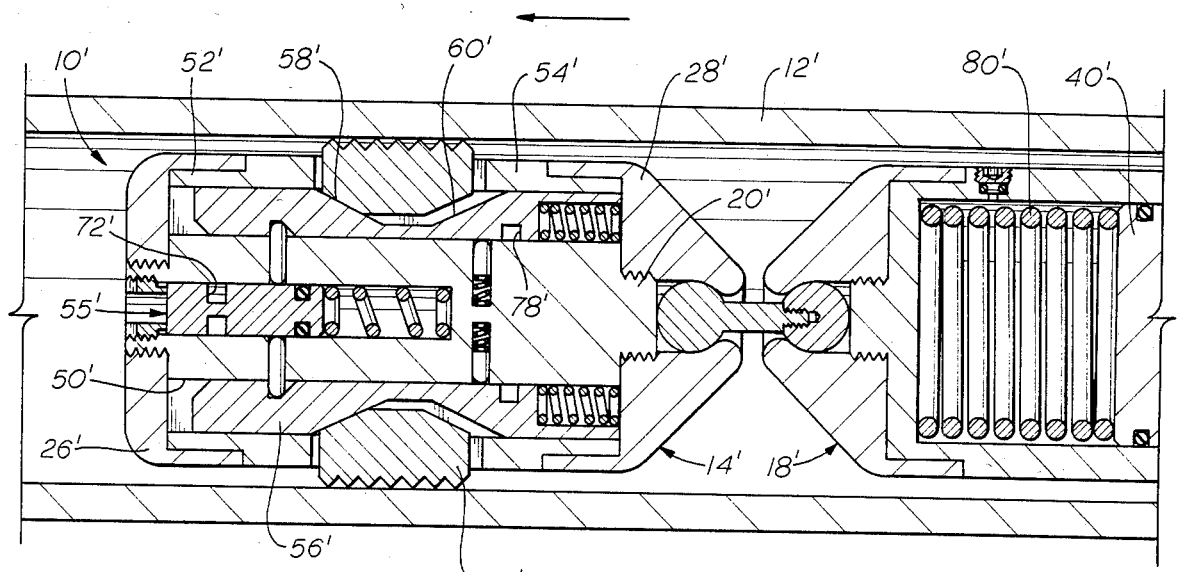
FIGS. 8–9 are cross-sectional views of an alternate embodiment of a conduit gripping element suited for use in the present invention, this embodiment permitting reversal of the direction of travel of the propulsion apparatus; and, FIG. 10 is a cross-sectional view of the alternate embodiment of the conduit gripping element, taken along section line 10—10 of FIG. 9.
Figure 9:
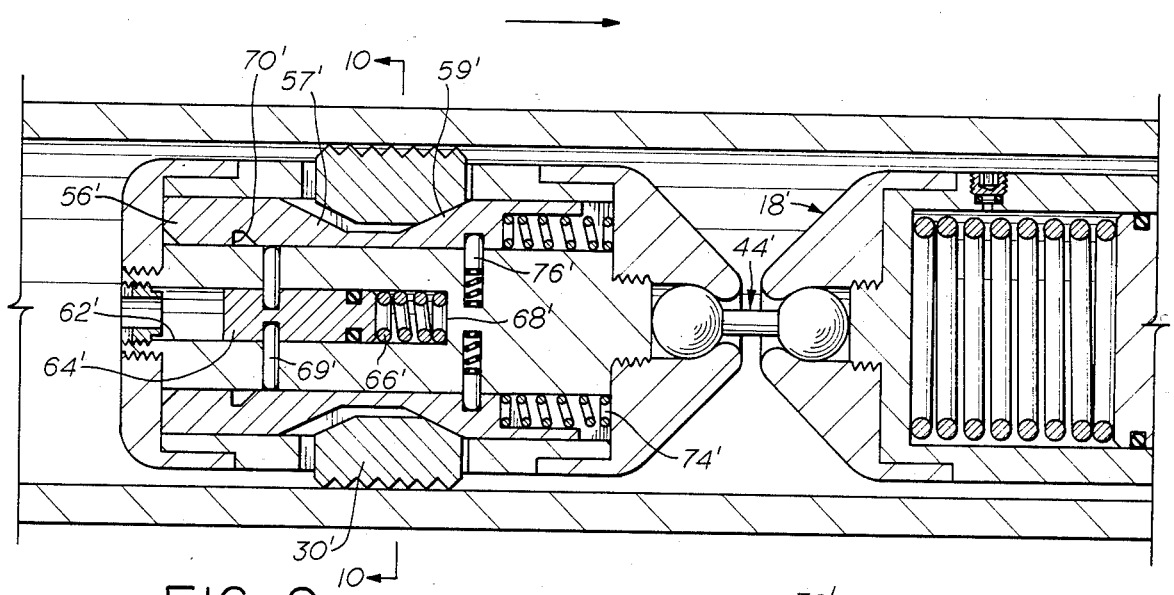

The sealed region 46 of the cylinder 42 is charged with an amount of gas sufficient to force the piston 40 to its full expansion in response to lowering the pressure of the conduit fluid to the relatively low pressure $P_2$. As the pressure within the conduit 12 is increased to the high pressure $P_1$, the piston 40 strokes into cylinder 42 until the pressure within the sealed region 46 reaches a level substantially equal to that within the conduit 12. Returning the conduit pressure to the low pressure level $P_2$ causes the piston 40 to stroke outward until it again contacts the stop 48. Alternately, a spring 80' or other mechanical device for providing a restoring force to bias the piston 40 out of the cylinder 42 could be used in addition to or in lieu of the use of gas alone. This is illustrated in FIGS. 8 and 9.

By cycling the conduit pressure between the high and low pressure levels $P_1,P_2$, the gripping elements 14,16 are repeatedly pulled together and pushed apart. This action causes the propulsion device 10 to travel through the conduit 12. As previously detailed, the two gripping elements 14,16 are adapted to move only in a single direction through the conduit 12. Referring to FIG. 1, as the conduit pressure is increased, the piston 40 strokes inward, biasing the gripping elements 14,16 toward one another; that is, the left gripping element 14 is biased rightward and the right gripping element 16 is biased leftward. However, the gripping elements 14,16 are adapted to lock within the conduit 12 against rightward motion. Accordingly, in response to increasing the conduit pressure, the left gripping element 14 locks within the conduit 12 and the right gripping element 16 is moved leftward the full distance of the piston stroke. Similarly, in response to decreasing the conduit pressure, the gripping elements 14,16 are biased away from one another, causing the right gripping element 16 to lock within the conduit 12 and the left gripping element 14 to move leftward the full distance of the piston stroke. This pressure cycling process is continued causing the propulsion apparatus 10 to move itself leftward through the conduit 12 a distance per pressure cycle equal to the stroke of the piston 40.

The action of the propulsion apparatus 10 is best illustrated in FIGS. 4-7, showing the propulsion apparatus 10 moving leftward through the conduit 10 in response to the fluid within the conduit 12 being cycled twice from a low pressure state to a high pressure state.

The propulsion apparatus 10 is used to transport equipment (not shown) through the conduit 12'. In oil and gas well applications, this equipment would include conduit cleaning elements, TFL equipment, survey equipment and the like. Such equipment would be attached to either the fore or aft end of the propulsion apparatus by threaded joint or other suitable connection.

Figure 10:
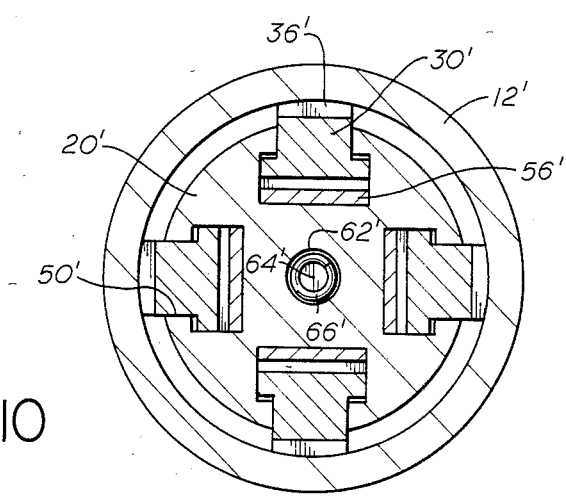

In an alternate embodiment of the present invention, illustrated in FIGS. 8-10, the propulsion apparatus 10' is adapted to have its direction of travel reversed on operator command. This embodiment is advantageous in that it allows the propulsion apparatus 10' to be directed through the conduit 12' to any desired position and then returned without the need for a return cable or any other external retrieval apparatus. This is especially beneficial in conduits which are significantly curved or which are quite long.

This alternate embodiment of the propulsion apparatus 10' differs from the first embodiment only in the configuration of the gripping elements 14',16'. A common gripping element biasing means 18 can be used in both embodiments. Each gripping element 14',16' has a main body portion 20' defining four longitudinal channels 50' symetrically arranged about the longitudinal axis of the main body portion 20'. First and second end portions 26',28' are connected to fore and aft positions on the main body portions 20'. The end portions 26',28' support annular retaining sleeves 52',54' coaxial with the main body portion 20'. A bearing element 56' is situated within each channel 50'. Each bearing element 50' is restrained by the main body portion 20' and the annular retaining sleeves 52',54' from any motion other than that in the longitudinal direction. Means 55' is provided for moving the bearing element 56' between a first position within the channel 50' and a second position within the channel 50', the first and second positions being a spaced longitudinal distance apart. This is described in greater detail below.

The upper surface of each bearing element 56' is concave and defines, in longitudinal cross-section, two opposed wedges 57',59'. These wedges 57',59' establish left and right tapered bearing surfaces 58',60'. Projecting outward from each channel 50' is a slip element 30'. Each slip element 30' extends into the bearing element concavity and has a lower surface profile generally corresponding to that of the bearing element concavity.

As best shown in FIG. 10, the range of motion of each slip element 30' is defined by boundary established by the corresponding channel 50', bearing element 56' and retaining sleeves 52',54'. Movement of the bearing element 56' between its first and second positions alters the range of possible motion of the slip element 30'. When the bearing element 56' is in its first position, as shown in FIG. 8, contact between the slip elements 30' and bearing elements 56' occurs along the left tapered bearing surface 58' through the full range of fore and aft movement of the slip element 30'. Similarly, when the bearing element 56' is in its second position, as shown in FIG. 9, contact between the slip elements 30' and bearing elements 56' occurs along the right tapered bearing surface 60'. Because the left and right tapered bearing surfaces 58',60' are tapered in opposite directions, shifting the bearing element 56' from its first position to its second position causes reversal of the direction in which the gripping element 14' is permitted to travel. As illustrated in FIG. 8, when the bearing element 56' is in its first position, the wedging action of the slip elements 30' between the bearing elements 56' and the conduit 12 occurs in response to attempted rightward displacement of the gripping element 14'. Conversely, when the bearing element 56' is in its second position, illustrated in FIG. 9, the gripping element 14' resists being moved in the leftward direction.

The means 55' for causing the bearing element 56' to shift from its first to second position is based on a detent system responsive to the pressure of the fluid within the conduit 12'. The gripping element main body portion 20' defines a cylinder 62' containing a piston 64'. The piston 64' is biased axially outward from the cylinder 62' by a coil spring 66' situated between the piston 64' and the cylinder end wall 68'. That portion of the cylinder 62' intermediate the piston 64' and the cylinder end wall 68' is isolated from fluid communication with the conduit 12'. The strength of the spring 66' is selected to maintain the piston 64' in constant position, shown in FIG. 8, at conduit pressures up to the highest pressure level $P_2$ applied in the standard cycling of the conduit pressure, while allowing the piston 64' to move toward the cylinder end wall 68' at a preselected conduit pressure $P_3$ higher than that applied in the normal pressure cycling.

Initially, as shown in FIG. 8, the bearing elements 56' are each locked in the first position by a pin 69' extending through the main body portion 20' into a detent 70' within the bearing element 56'. The pins 69' seat against the walls of the piston 64'. Upon application of conduit pressure $P_3$, the piston 64' is displaced toward the cylinder end wall 68', positioning an annular recess 72' in the piston 64' beneath each of the pins 69'. In response to this, the bearing element 56', which is biased toward the second position by a bearing element spring 74', forces the pins 69' into the annular piston recess 72'. No longer restrained by the pins 69, the bearing element 56' moves to the second position, shown in FIG. 9. As the bearing element 56' reaches the second position, a second pin 76' within the main body portion 20' is forced upward into a corresponding second pin recess 78' in the bearing element 56'. This causes the bearing element 56' to lock against further displacement upon reaching the second position.

The present invention and the preferred modes of practicing it have been described. It is to be understood that the foregoing description is illustrative only and that other means and techniques can be employed without departing from the full scope of the invention as set forth in the appended claims.

What is claimed is:

1. Apparatus adapted to propel itself through a fluid-bearing conduit in response to varying the pressure of the fluid within said conduit, said apparatus comprising:
    a first wedge and slip assembly, said first wedge and slip assembly being moveable through said conduit in a first axial direction and being adapted to resist being moved in the opposed axial direction;
    a second wedge and slip assembly, said second wedge and slip assembly being moveable through said conduit in said first axial direction and being adapted to resist being moved in the opposed axial direction, said second wedge and slip assembly being situated a spaced axial distance from said first wedge and slip assembly; and,
    means for biasing said first and second wedge and slip assemblies toward one another in response to bringing the conduit fluid to a first pressure level and for urging said first and second wedge and slip assemblies away from one another in response to bringing the conduit fluid to a second pressure level.

2. The apparatus as set forth in claim 1, wherein said biasing means includes a piston-cylinder assembly.

3. The apparatus as set forth in claim 2, wherein said piston and cylinder define an enclosed volume sealed against fluid communication with said fluid in said conduit, said enclosed volume containing a gas.

4. The apparatus as set forth in claim 2, wherein said piston-cylinder assembly defines an enclosed volume sealed against fluid communication with said fluid in said conduit, there being a spring positioned in said enclosed volume, said spring being adapted to bias the piston in a direction outward from said cylinder.

5. The apparatus as set forth in claim 2, wherein said first wedge and slip assembly is attached to said cylinder and said second wedge and slip assembly is attached to said piston.

6. The apparatus as set forth in claim 1, wherein:
    said biasing means is a pressure responsive device having first and second opposed ends moveable relative to one another between an extended condition and a contracted condition, said biasing means being adapted to assume said extended condition in response to the pressure within said conduit being less than or equal to a preselected pressure level and being adapted to cause said first and second ends to move toward one another in response to said pressure being raised above said preselected pressure level; and, said first wedge and slip assembly being connected to said first end of said biasing means and said second wedge and slip assembly being connected to said second end of said biasing means.

7. The apparatus as set forth in claim 6, wherein said first and second wedge and slip assemblies are connected to said biasing means by pivotable connectors.

8. The apparatus as set forth in claim 1, wherein said first and second wedge and slip assemblies are adapted to selectively reverse the permitted direction of travel from said first axial direction to said other axial direction.

9. The apparatus as set forth in claim 8, wherein said first and second wedge and slip assemblies are adapted to reverse the permitted direction of travel from said first axial direction to said other axial direction in response to the pressure of the fluid within said conduit being raised to a preselected level higher than the highest pressure applied in the pressure cycling used to propel said propulsion apparatus.

10. A system for transporting equipment through a fluid-bearing conduit, comprising:

means for selectively increasing and decreasing the pressure of the fluid within said conduit; and, pressure responsive propulsion apparatus, said propulsion apparatus including:

a first element adapted to permit movement of itself in a first axial direction through said conduit and to resist being moved in the opposite axial direction;

a second element adapted to permit movement of itself in said first axial direction through said conduit and to resist being moved in said opposite axial direction;

an extendable-retractable element having opposed end portions, said first element being connected to one of said end portions and said second element being connected to the other of said end portions, said extendable-retractable element being adapted to displace its end portions away from one another in response to a decrease in the pressure of the fluid within said conduit and to move its end portions toward one another in response to an increase in the pressure of the fluid within said conduit.

11. The system as set forth in claim 10, wherein said first and second elements each include a wedge block and slip assembly.

12. The system as set forth in claim 10, wherein said first and second elements each include a main body portion defining a plurality of wedges, each of said wedges having a slip associated therewith, said slips of each of said first and second elements being adapted to resist lockingly engaging the inner surface of said conduit in response to urging said first and second elements in a first axial direction through said conduit and being adapted to lockingly engage the inner surface of said conduit in response to urging said first and second elements in the opposite axial direction through said conduit.

13. The system as set forth in claim 10, wherein said extendable-retractable element includes:

a cylinder defining a bore coaxial with said conduit;

a piston situated in said bore and being extendable and retractable within said bore, said piston sealingly engaging said cylinder to establish an enclosed volume bounded by the inner surface of said cylinder and said piston, said enclosed volume being in fluid isolation from said conduit; and, said piston being adapted to remain at a selected maximum extension from said cylinder at conduit fluid pressures less than or equal to a preselected pressure level and to stroke into said cylinder in response to the pressure of the fluid within said conduit being raised above said preselected pressure level.

14. Apparatus adapted to propel itself through a fluid bearing conduit, said apparatus comprising:

an extensible-retractable element having opposed first and second ends, said extensible-retractable element being adapted to increase the distance intermediate said first and second ends in response to placing the conduit fluid at a first pressure level and to decrease the distance intermediate said first and second ends in response to placing the conduit fluid at a second pressure level;

a first element adapted to be positioned within said conduit, said first element including a one-way locking device for securing said first element against movement in a first direction through said conduit and permitting said first element to be freely moved in the opposite direction through said conduit, said first element being connected to said extensible-retractable element first end; and, a second element adapted to be positioned within said conduit, said second element including a one-way locking device for securing said second element against movement in said first direction and permitting said second element to be freely moved in said opposite direction, said second element being connected to said extensible-retractable element second end.

15. The apparatus as set forth in claim 14, further comprising means for selectively reversing the permitted direction of travel of said first and second elements.

16. The apparatus as set forth in claim 15, wherein said reversing means is adapted to cause reversal of the permitted direction of travel of said first and second elements in response to the application of a preselected pressure signal to the fluid within said conduit.

17. The apparatus as set forth in claim 15, wherein said reversing means is adapted to cause reversal of the permitted direction of travel of said first and second elements in response to raising the pressure of the fluid within the conduit to a level higher than either of said first and second pressure levels.

18. The apparatus as set forth in claim 14, wherein said extensible-retractable element is a piston-cylinder assembly defining an enclosed volume sealed against fluid communication with said fluid in said conduit, said piston being adapted to assume a fully extended position relative to said cylinder in response to the pressure within said conduit being less than or equal to a preselected first pressure level and to be displaced a distance into said cylinder in response to raising the pressure of the fluid within the conduit to a level above said first pressure level.

* * * * *